US007606449B2

(12) United States Patent
Paluck et al.

(10) Patent No.: US 7,606,449 B2
(45) Date of Patent: Oct. 20, 2009

(54) ADAPTIVE SWITCH CONTAMINATION COMPENSATION

(75) Inventors: Paul D. Paluck, Orland Park, IL (US); Doug Jacobson, Elmhurst, IL (US)

(73) Assignee: Capable Controls, Inc., Bensenville, IL (US)

( * ) Notice: Subject to any disclaimer, the term of this patent is extended or adjusted under 35 U.S.C. 154(b) by 791 days.

(21) Appl. No.: 11/357,759

(22) Filed: Feb. 16, 2006

(65) Prior Publication Data

US 2007/0187364 A1 Aug. 16, 2007

(51) Int. Cl.
*G01N 21/00* (2006.01)
*G05F 1/10* (2006.01)
*H02J 3/12* (2006.01)

(52) U.S. Cl. .......................... 385/16; 323/234; 356/434

(58) Field of Classification Search ............. 218/1–157; 246/158; 323/205–211, 234–298, 304–317; 356/432–444; 361/139; 385/16
See application file for complete search history.

(56) References Cited

U.S. PATENT DOCUMENTS 4,135,234 A * 1/1979 Forge ...................... 363/21.17
4,223,306 A * 9/1980 Reimer ....................... 340/650
4,727,272 A * 2/1988 Foch et al. .................. 327/440
5,015,172 A * 5/1991 Landis .......................... 431/6
5,134,612 A * 7/1992 Yoshimura .................. 370/545
7,301,289 B2 * 11/2007 Okamoto et al. ............ 315/291

* cited by examiner

*Primary Examiner*—Gregory J Toatley, Jr.
*Assistant Examiner*—Jarreas C Underwood
(74) *Attorney, Agent, or Firm*—Schiff Hardin LLP

(57) ABSTRACT

In a method and system for compensating for contamination of a switch or of a load circuit connected to the switch in a switch circuit, on/off signal levels are obtained corresponding to on/off states of said switch based on a polling signal which turns said switch on and off. With each polling signal, the on signal level is compared with the off signal level to determine whether the signal levels differ by more than a defined amount indicating unacceptable switch or switch load circuit contamination. Based on said comparison, a switch or switch load circuit contamination indication output signal is provided indicating whether or not the switch or the switch load circuit has been unacceptably contaminated. This signal is used by said switch circuit for continued operation of said switch circuit or for taking a corrective action if unacceptable switch or switch load circuit contamination is determined.

14 Claims, 2 Drawing Sheets

TEMPORARY MEMORY STORAGE LOCATION Svl1, Svl2, Svl3, Svl4

Sbkl = SWITCH BACKGROUND VOLTAGE DUE TO CONTAMINATION CONDUCTIVITY.

Sal = SWITCH ACTIVE LEVEL

ADAPTIVE SWITCH CONTAMINATION COMPENSATION

BACKGROUND

It is well known that switches, or load circuits connected to the switches, can be contaminated, resulting in a deterioration of operation. For example, during transit, such as in a salt water environment, the so-called "off" resistance between the switch terminals may begin to decrease so that there is less of a difference between the off condition and the on condition for current flow through the switch (difference between on and off condition resistance). Furthermore, in operation when the switch is installed in a circuit, contamination of the switch, or of the load circuit connected to the switch, may increase over time (decreasing off resistance) so that at some point, operation of the switch in the switch circuit becomes unacceptable because the off resistance compared to the on resistance is not a sufficiently great difference to provide reliable operation of the circuit.

SUMMARY

It is an object to continually monitor a condition of a switch, or of a load circuit connected to the switch, in a switch circuit with respect to contamination.

In a method and system for compensating for contamination of a switch or of a load circuit connected to the switch in a switch circuit, on/off signal levels are obtained corresponding to on/off states of said switch based on a polling signal which turns said switch on and off. With each polling signal, the on signal level is compared with the off signal level to determine whether the signal levels differ by more than a defined amount indicating unacceptable switch or switch load circuit contamination. Based on said comparison, a switch or switch load circuit contamination indication output signal is provided indicating whether or not the switch or the switch load circuit has been unacceptably contaminated. This signal is used by said switch circuit for continued operation of said switch circuit or for taking a corrective action if unacceptable switch or switch load circuit contamination is determined.

DESCRIPTION OF THE PREFERRED EMBODIMENT

Figure 1:
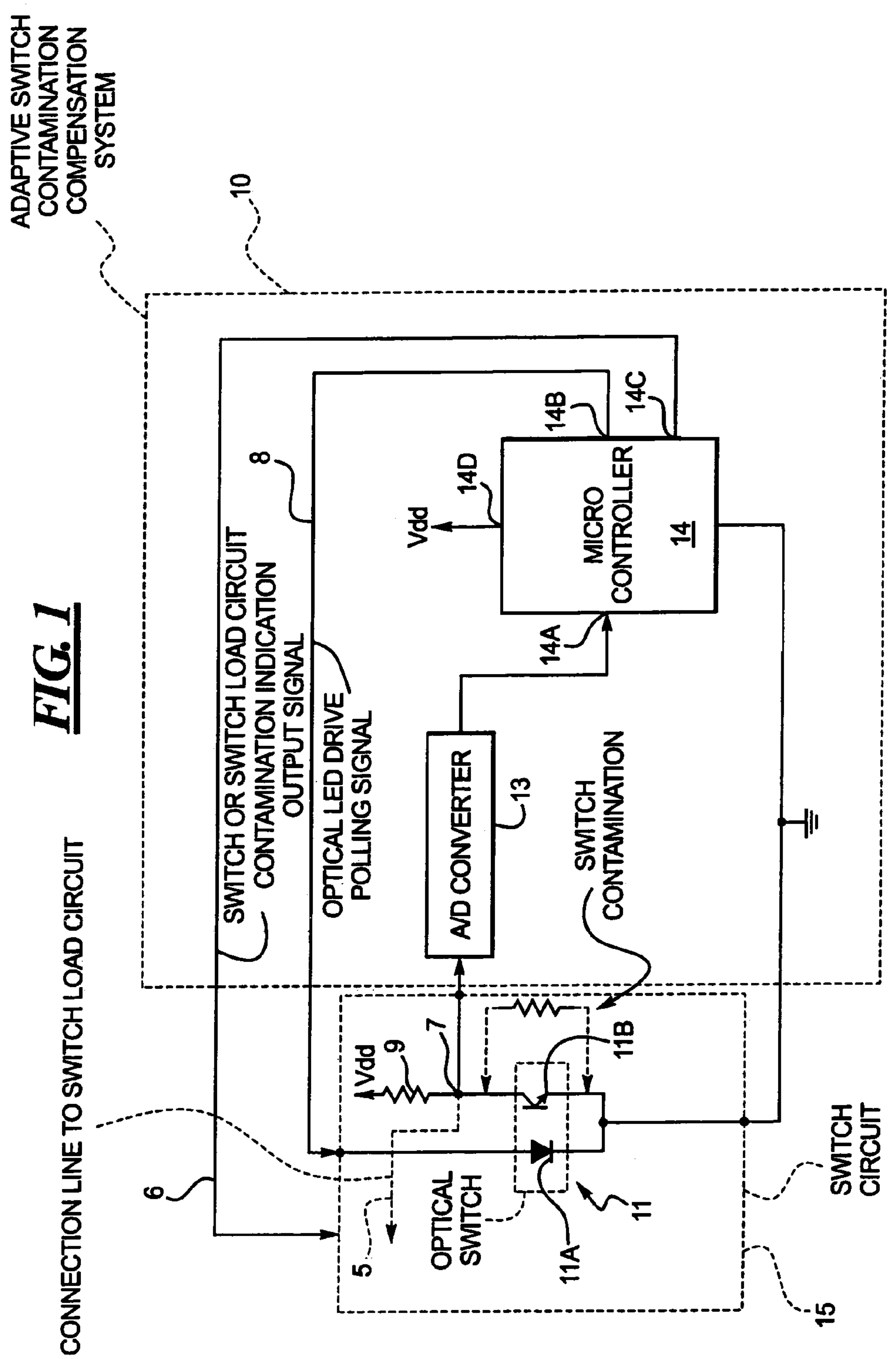
FIG. 1 is a schematic diagram of an adaptive switch contamination compensation system of a preferred embodiment.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

As shown in FIG. 1, the adaptive switch contamination compensation (hereinafter "ASCC") system 10 provides a way to electronically determine the condition of a switch 11, or of a load circuit connected by line 5 to the switch, in an electronic switch circuit for which the ASCC concept is being used. Such a switch 11, which is present in switch circuit 15, may be, as shown in FIG. 1, an optical switch which is turned on and off by an optical LED 11A or by selectively blocking light between the LED 11A and a phototransistor 11B. The ASCC system 10 then compensates for varying degrees of switch 11 or switch load circuit contamination in the switch circuit 15 by providing a switch or switch load circuit contamination indication output signal on line 6 to the switch circuit 15, resulting in improved switching quality and repeatability. The signal on line 6 is utilized within the switch circuit 15 to take a corrective action which can take many forms, such as, for example, deactivating the circuit completely or compensating for the switch or switch load circuit deterioration or contamination.

The following description describes the ASCC system related to an optical electronic switch 11; the concept may, however, be applied to various types of electrical/electronic switches.

The ASCC system 10 is comprised of two (2) functional blocks measuring contaminations of the optical switch 11 containing the photo emitter (LED) 11A and phototransistor 11B, or switch load circuit on line 5: (1) an analog to digital converter 13; and (2) a microcontroller or microprocessor 14. These blocks are linked together in a closed loop configuration as shown in FIG. 1.

Initially before turning on a polling signal on line 8, the system microcontroller 14 obtains a background signal. This background signal serves as a basis for comparison between switch active and inactive levels. This background signal level is stored for future reference. Also, the background signal may be repeated multiple times and mathematically manipulated to enhance accuracy (averaged, majority voted etc.). Following the establishment of a suitable switch background signal, the system microcontroller 14 polls the switch input at 7 with a polling signal on optical LED drive line 8. This is performed during switch photo emitter 11A on time. A comparison is then made between the analog. to digital levels acquired during photo emitter 11A off time and during photo emitter 11A on time. If the digital value of the difference (result of the A/D conversions) is calculated to represent, for example, a 25 percent or greater change, it is accepted as a valid switch 11B operation. A 25 percent change is an example; the actual percentage change can vary depending on the application. Again, this may be repeated multiple times and mathematically manipulated to enhance accuracy (averaged, majority voted etc.).

Using the ASCC technique, variations in switch 11B conductivity, switch contamination (switch shunt resistance 12) and, the absolute value of switching level are compensated for. Also contamination of the switch load circuit on line 5 is compensated for. All that is required is that a measurable change in switching level occurs at switch actuation. The ASCC technique may be employed in single or multiple switch systems.

Now a more detailed description will be provided. The above-described ASCC system 10 shown in FIG. 1 is linked to the switch circuit 15 having the optical switch 11 comprising the photo emitter 11A which by light radiation changes the collector-emitter resistance of the switch 11B. Switch contamination, or contamination of the switch load circuit on line 5 is represented by the shunt resistance 12. The switch transistor 11B is driven from a power source Vdd via resistor 9.

The switch 11B collector high and low signal levels are transmitted via A/D converter 13 to the input 14A of the microcontroller 14. Microcontroller 14 is driven by a power source Vdd at 14D.

Microcontroller 14B outputs at 14B through line 8 the optical LED drive polling signal to the photo emitter 11A. Of course many other ways may be provided for polling the switch—that is turning a switch on and off—depending on the type of switch and/or switch circuit.

Microcontroller 14 outputs at 14C a switch or switch load circuit contamination indication output signal on line 6. This signal is an input to switch circuit 15. Switch circuit 15 can be of a wide variety of circuits using a switch where knowledge is necessary concerning the operability of the switch 11B being employed in the switch circuit 15 or the switch load circuit connected to the switch, and where an action is to be taken, based on a repetitive polling of the switch by a polling signal, in the switch circuit 15 based on switch or switch load deterioration. The action taken could be, for example, shutting down the circuit 15, or compensating in the circuit for the off resistance deterioration of the switch.

Figure 2:
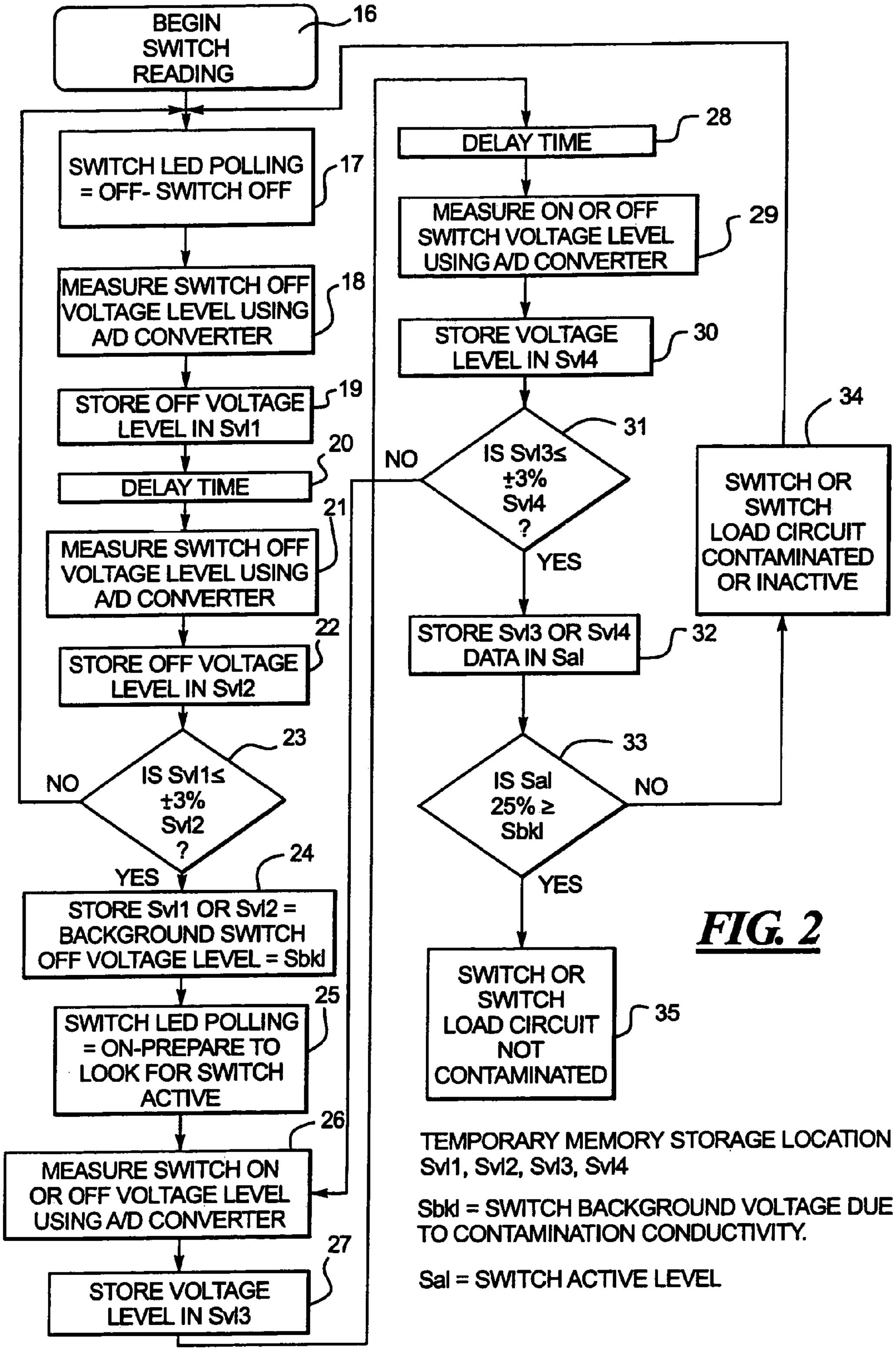
FIG. 2 is a flow diagram of software employed in a microcontroller of FIG. 1 for operation of the system of FIG. 1.

The flow chart for the software which operates the microcontroller 14 is shown in FIG. 2. The various logic blocks of this flow chart are indicated at 16 through 35.

A step-by-step operation, which summarizes the flow chart FIG. 2 for the adaptive switch contamination compensation system 10 of the preferred embodiment, is as follows:

1.) Turn off 'Optical LED Drive' polling signal on line 8

2.) Measure by analog to digital conversion (A/D converter 13) the voltage at switch 11B output 7. Save the voltage (data) in microcomputer 14 memory (Svl1) location.

3.) Microcomputer 14 waits for prescribed time period.

4.) Measure by analog to digital conversion (A/D converter 13), voltage at switch 11B output 7. Save voltage (data) in microcomputer 14 memory (Svl2) location.

5.) Microcomputer 14 calculates (Svl1±3%)≦Svl2.

6.) If answer of (5) is no, >3% go to step (2).

7.) Save data in Svl1 or Svl2 in memory location Sbkl.

8.) Turn on 'Optical LED Drive' polling signal on line 8.

9.) Measure by analog to digital conversion, voltage at switch 11B output 7. Save voltage (data) in microcomputer 14 memory (Svl3) location.

10.) Microcomputer 14 waits for prescribed time period.

11.) Measure by analog to digital conversion, voltage at switch 11B output 7. Save voltage (data) in microcomputer 14 memory (Svl4) location.

12.) Microcomputer 14 calculates (Svl3±3%)≦Svl4.

13.) If answer of (12) is no, >3% go to step (9).

14.) Save data in Svl3 or Svl4 in memory location Sal.

15.) Microcomputer 14 calculates: Is Sal (25%≧Sbkl) if no go to (end) turn off signal on line 6 at 14C of microcomputer 14.

16.) Switch 11B is active, turn on signal at 14C of microcomputer 14.

Definitions for times used in the step-by-step operation above are as follows:

Svl1=Switch voltage level number 1—Microcontroller 14 data memory location.

Svl2=Switch voltage level number 2—Microcontroller 14 data memory location.

Svl3=Switch voltage level number 3—Microcontroller 14 data memory location.

Svl4=Switch voltage level number 4—Microcontroller 14 data memory location.

Sbkl=Switch background output level.

Sal=Switch active level.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. An adaptive switch contamination compensation system for compensating for contamination of a switch or a switch load circuit connected to said switch in a switch circuit, comprising:

a microcontroller receiving on/off signal levels corresponding to on/off states of said switch;

said microcontroller having an output providing a polling signal for repeatedly turning said switch on and off in said switch circuit; and said microcontroller comparing said on/off signal levels each time said switch is polled by said polling signal to determine if the on signal level differs from the off signal level by more than a defined amount indicating that the switch or said switch load circuit has been unacceptably contaminated, and said microcontroller outputting a switch or switch load circuit contamination indication output signal to said switch circuit based on said comparison permitting said switch circuit to continue operation with said switch or to take action when the switch or said switch load circuit has been determined to be unacceptably contaminated.

2. A system of claim 1 wherein said switch or switch load circuit contamination indication output signal is present when the switch or switch load circuit has not been unacceptably contaminated and is not present when said switch or switch load circuit has been unacceptably contaminated.

3. A system of claim 1 wherein said microcontroller without the polling signal checks the off signal level of said switch and stores that signal level corresponding to said off signal level as a background level to be used by said microcontroller during said comparison of the on/off signal levels initiated by said polling signals.

4. A system of claim 1 wherein an A/D converter is provided having an input receiving analog on/off signal levels of said switch and providing corresponding on/off digital signal levels to said microcontroller.

5. A system of claim 1 wherein said switch comprises an optical switch and said polling signal repeatedly energizes an LED diode of said optical switch.

6. A system of claim 1 wherein with said microcontroller without the polling signal checks the off signal level of said switch and stores that signal level corresponding to said off signal level as a background level, then after a delay time, still without the polling signal, the microcontroller checks the off signal level again of said switch and stores that signal level corresponding to said off signal level at that time as another background level, and checking the two background levels to see whether they differ by more than a predetermined amount, and if they do not, then using either one of the background levels by said microcomputer during said comparison of the on/off signal levels initiated by said polling signals.

7. An adaptive switch contamination compensation system for compensating for contamination of a switch or a switch load circuit connected to said switch in a switch circuit, comprising:

an A/D converter having an input receiving analog on/off signal levels of said switch, and providing corresponding on/off digital signal levels to a microcontroller;

said microcontroller having an output providing a polling signal for repeatedly turning said switch on and off in said switch circuit; and said microcontroller comparing said on/off digital signal levels each time said switch is polled by said polling signals to determine if the on digital signal level differs from the off digital signal level by more than a defined amount indicating that the switch or switch load circuit has been unacceptably contaminated, and said microcontroller outputting a switch or switch load circuit contamination indication output signal to said switch circuit based on said comparison permitting said switch circuit to continue operation or to take action when the switch or switch load circuit has been determined to be unacceptably contaminated.

8. A method for compensating for contamination of a switch or a switch load circuit connected to said switch in a switch circuit, comprising the steps of:

obtaining on/off signal levels corresponding to on/off states of said switch in said switch circuit based on a polling signal which turns said switch on and off;

with each polling signal, comparing the on signal level with the off signal level to determine whether the signal levels differ by more than a defined amount indicating unacceptable switch or switch load circuit contamination; and based on said comparison, providing a switch or switch load circuit contamination indication output signal indicating whether or not the switch or the switch load circuit has been unacceptably contaminated for use by said switch circuit for continued operation of said switch circuit or for taking a corrective action if unacceptable switch or switch load circuit contamination is determined.

9. A method of claim 8 wherein a background signal level of said switch is obtained prior to polling said switch on and off, said background signal level of said switch being used in said comparison of said on and off signal levels initiated by said polling signal.

10. A method of claim 8 wherein if the difference between the digital on/off signal levels is greater than said defined amount, then said switch or switch load circuit contamination indication output signal is sent to said switch circuit indicating that the switch or switch load circuit is not unacceptably contaminated, and if the predetermined difference is less than said defined amount indicating unacceptable switch or switch load circuit contamination then no contamination indication output signal is output to said switch circuit.

11. A method of claim 8 wherein a background level signal is obtained for use in comparing said on/off signal levels.

12. A method of claim 8 wherein the on/off signal levels being compared are on/off signal levels of said switch which have been converted by an analog-digital converter to digital on/off signals.

13. A method of claim 8 wherein said switch comprises an optical switch and said polling signal repeatedly energizes an LED diode of said optical switch.

14. A method of claim 8 wherein with said microcontroller without the polling signal checks the off signal level of said switch and stores that signal level corresponding to said off signal level as a background level, then after a delay time, still without the polling signal, the microcontroller checks the off signal level again of said switch. and stores that signal level corresponding to said off signal level at that time as another background level, and checking the two background levels to see. whether they differ by more than a predetermined amount, and if they do not, then using either one of the background levels by said microcomputer during said comparison of the on/off signal levels initiated by said polling signals.

* * * * *